P. A. ULRICH.
FRUIT PICKER.
APPLICATION FILED APR. 28, 1913.
1,091,096. Patented Mar. 24, 1914.
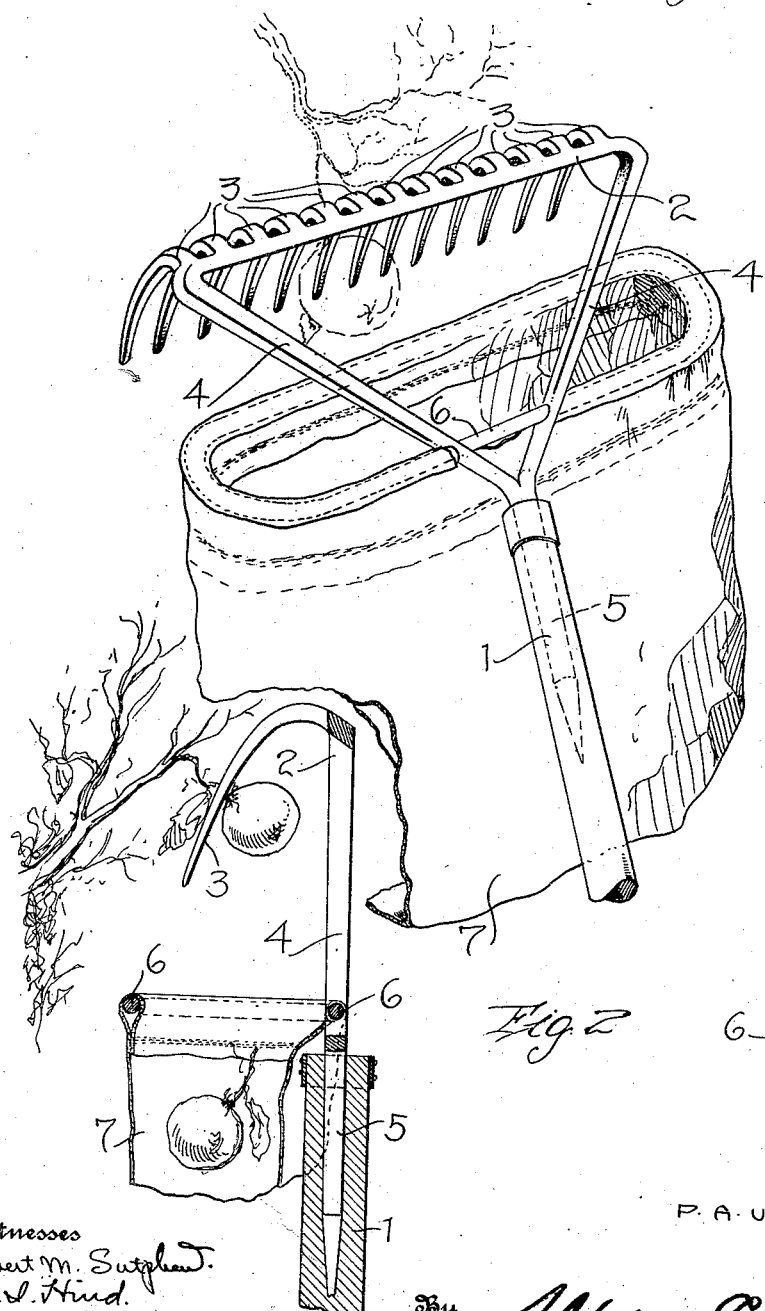
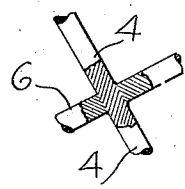
Inventor
P. A. ULRICH

UNITED STATES PATENT OFFICE.

PETER A. ULRICH, OF DEER CREEK, ILLINOIS.

FRUIT-PICKER.

1,091,096.  Specification of Letters Patent.  Patented Mar. 24, 1914.

Application filed April 28, 1913. Serial No. 764,232.

*To all whom it may concern:*

Be it known that I, PETER A. ULRICH, a citizen of the United States, residing at Deer Creek, in the county of Tazewell and State of Illinois, have invented certain new and useful Improvements in Fruit-Pickers, of which the following is a specification, reference being had to the accompanying drawings.

This invention relates to new and useful improvements in fruit pickers and my object is to provide a device of this character which will quickly sever the fruit from the tree and collect the same as it falls therefrom.

A further object of the invention resides in providing a fruit grab formed from a single piece of metal and a still further object resides in providing a receptacle in connection with the grab to receive the fruit as it is severed from the tree.

A still further object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a perspective view partly in section. Fig. 2 is a vertical section through the device. Fig. 3 is a fragmentary perspective view partly in section showing the connection between one of the arms of the grab and the support for the receptacle.

In describing my invention, I shall refer to the drawing in which similar reference characters designate corresponding parts throughout the several views and in which 1 indicates an elongated handle member, such as is usually used in connection with fruit pickers and mounted on the outer end thereof is a fruit grab. This grab or severing device consists of a bar of metal 2, which has a plurality of preferably curved rake teeth 3 formed integral therewith and the ends of said bar are bent to converge downwardly about centrally of the rake teeth 3. The downwardly converging portions of the bar 2 form arms 4 joined, welded or otherwise similarly secured together and extended for a short distance to form a shank 5 which is received in a socket in the upper or outer end of the handle member 1. A hoop-like band or bar 6 formed of a continuous strand of metal is welded or otherwise rigidly secured to the convergent arms 4 at a point just above their juncture. This hoop-like band or bar is somewhat elongated and forms a support for the upper end of a flexible receptacle 7, the latter being secured in any desired manner at its upper edges to said support. This hoop-like support is disposed on the same side of the arms 4 as the teeth 3, so that the receptacle is disposed below the fruit grab to receive the fruit as the same is severed from the tree and the outer bar or rail of the support extends to a plane beyond the plane of the outer free ends of the teeth of said grab.

In practice, it will be seen that when it is desired to sever particular fruit from the tree, the device is raised so as to receive the stems of the particular fruit between the teeth 3. By drawing downwardly thereon, the fruit will be severed from the branches and fall to the receptacle 7 and when sufficient fruit has been collected therein, the device may be lowered and said fruit removed from the receptacle. Of course, if desired, a chute may be provided in connection with this receptacle 7, so as to conduct the fruit to the hand of the operator, as the same is severed.

It is to be particularly noted that the extremities of the rake teeth terminate in spaced relation to and above the relatively free side of the bar 6 which supports the receptacle 7 and that the said side of the bar occupies a plane beyond the relatively vertical plane of the outer or free extremities of said teeth. Hence, the space between the relatively free side of the bar 6 and the extremities of the rake teeth 3 will permit the rake teeth to be easily inserted over the fruit, and when the fruit is severed from the tree, it will be sure to fall into the receptacle 7, the mouth of which is disposed in a plane substantially at right angles to the plane of the downwardly converging arms 4.

From the foregoing it will be seen that I have provided a device which is simple and durable in construction, inexpensive to manufacture, and one which will be very efficient and useful in operation, and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

A device of the class described comprising a handle member, a pair of downwardly convergent arms secured to said handle member and arranged in the same longitudinal plane therewith, a bar formed integral at its ends with the outer ends of said arms, an additional bar formed on said arms adjacent the meeting ends thereof, said last mentioned bar being elongated laterally and designed to form a closed loop projecting outwardly from the longitudinal plane of said arms, and a plurality of downwardly curved rake teeth formed on said first mentioned bar, the extremities of said teeth being directed toward the outer side edge of said closed loop and terminating above the same in spaced relation thereto, the outer side edge of said closed loop occupying a plane beyond the longitudinal plane of the outer extremities of said teeth.

In testimony whereof I hereunto affix my signature in the presence of two witnesses.

PETER A. ULRICH.

Witnesses:
W. L. PENNIMAN,
WM. ROBBINS.

Copies of this patent may be obtained for five cents each, by addressing the "Commissioner of Patents, Washington, D. C."